OR 3,771,850

United States Patent
Casler

[11] 3,771,850
[45] Nov. 13, 1973

[54] SCAN ANGLE MULTIPLIER OF CONSTANT APERTURE

[75] Inventor: David H. Casler, Rochester, Minn.

[73] Assignee: International Business Machines Corporation, Armonk, N.Y.

[22] Filed: Aug. 4, 1971

[21] Appl. No.: 169,098

Related U.S. Application Data

[63] Continuation of Ser. No. 854,470, Sept. 2, 1969, abandoned.

[52] U.S. Cl. .................. 350/6, 350/231, 350/285, 178/7.6
[51] Int. Cl. ............................................. G02b 17/00
[58] Field of Search .................. 350/6, 7, 285, 109, 350/112, 231; 178/7.6

[56] References Cited
UNITED STATES PATENTS

| | | | |
|---|---|---|---|
| 3,592,523 | 7/1971 | Shang Yu Wu | 350/7 |
| 3,506,834 | 4/1970 | Buchsbaum | 350/169 |
| 3,450,455 | 6/1969 | Landre | 350/7 |
| 3,432,239 | 3/1969 | Holland | 356/112 |
| 3,448,458 | 6/1969 | Carlson et al. | 350/6 |

Primary Examiner—David Schonberg
Assistant Examiner—Michael J. Tokar
Attorney—J. Michael Anglin, Carl W. Laumann, Jr. and J. Jancin, Jr.

[57] ABSTRACT

A method and apparatus are described for increasing the scan angle of a light deflector without a corresponding decrease in effective aperture. By imaging a deflector back upon itself, the resultant multiple reflections produce an enhancement of the scan angle. The scan angle multiplier is particularly applicable to refective deflectors where the resolution is limited by the deflection angle. The device comprises two mirrors and two lenses separated by the sum of their focal lengths. One or both of the mirrors pivot about the focal points of their associated lenses. The input mirror is positioned so that its normal is at an angle from the axis of the lenses, while the normal of the second mirror is parallel to the axis.

19 Claims, 5 Drawing Figures

INVENTOR
DAVID H. CASLER

SCAN ANGLE MULTIPLIER OF CONSTANT APERTURE

CROSS REFERENCE TO RELATED APPLICATIONS

This application is a continuation of co-pending application Ser. No. 854,470, filed Sept. 2, 1969, and now abandoned.

BACKGROUND OF THE INVENTION

1. Field of the Invention

This invention generally relates to light beam deflection techniques and devices, and more particularly to a light beam scan angle multiplier having a constant aperture.

2. Description of the Prior Art

Many of the presently available laser beam deflection techniques are limited in speed, resolution, or versatility. In some cases, it is possible to enhance one of these characteristics, but it is usually at the expense of one or both of the others. For example, higher speed might require a less massive deflector, and thus a smaller aperture. On the other hand, operation in a resonant mode might be necessary, with the resulting loss in beam positioning control.

Several techniques have been proposed to overcome this difficulty. Some of these involve the use of a number of small angle deflectors in series or complicated mirror systems to allow several passes through the same deflector. There is a limit to this approach, however, because the input beam diameter must become smaller as the number of stages is increased to avoid vignetting of the deflected beam by the edges of the last deflector.

Leo Beiser has described in the Apr., 1968, issue of *Applied Optics* at pages 647 to 650 a technique that avoids vignetting at the scanning aperture by progressively imaging one deflector upon the next with a series of lenses. As before, this method requires a number of deflectors, although the beam can be recycled through virtually the same optical system by the proper mirror arrangement to further enhance the scan.

SUMMARY OF THE INVENTION

It is therefore an object of this invention to provide a technique of scan angle multiplication which allows a constant aperture to be maintained.

It is a further object of the instant invention to provide a laser beam scan angle multiplying device which is particularly simple, compact and inexpensive.

It is another object of the invention to provide a scan angle multiplying device having improved resolution without attendant sacrifice of speed or versatility.

According to the present invention, the foregoing and other objects are obtained by providing a technique whereby the light beam deflector is imaged back upon itself producing multiple reflections with a resulting enhancement of the scan angle. In its preferred form, a device which embodies this technique comprises two mirrors and two lenses separated by the sum of their focal lengths. The input mirror to the system is a scanning mirror which pivots about the focal point of its associated lens. The normal of this mirror at the point of zero deflection is at an angle from the axis of the lenses. The second mirror is located at the focal plane of its associated lens and is stationary with its normal parallel to the axis of the lenses. In an alternative embodiment, the input mirror is stationary while the second mirror is the scanning mirror pivoting about the focal point of its associated lens. In yet another embodiment, both mirrors are scanning mirrors pivoting about the focal points of their associated lenses. If the two mirrors are operated in the proper phase, with both rotational axes in the same plane, the result will be a total deflection having a gain of almost twice that obtained by using only one scanning mirror. If, on the other hand, the axes about which the two mirrors are pivoting are perpendicular, the output beam will scan a raster determined by the relative frequencies of the two mirrors.

BRIEF DESCRIPTION OF THE DRAWING

The specific nature of the invention, as well as other objects, aspects, uses and advantages thereof, will clearly appear from the following description and from the accompanying drawing, in which.

DESCRIPTION OF THE PREFERRED EMBODIMENTS

Figure 1:
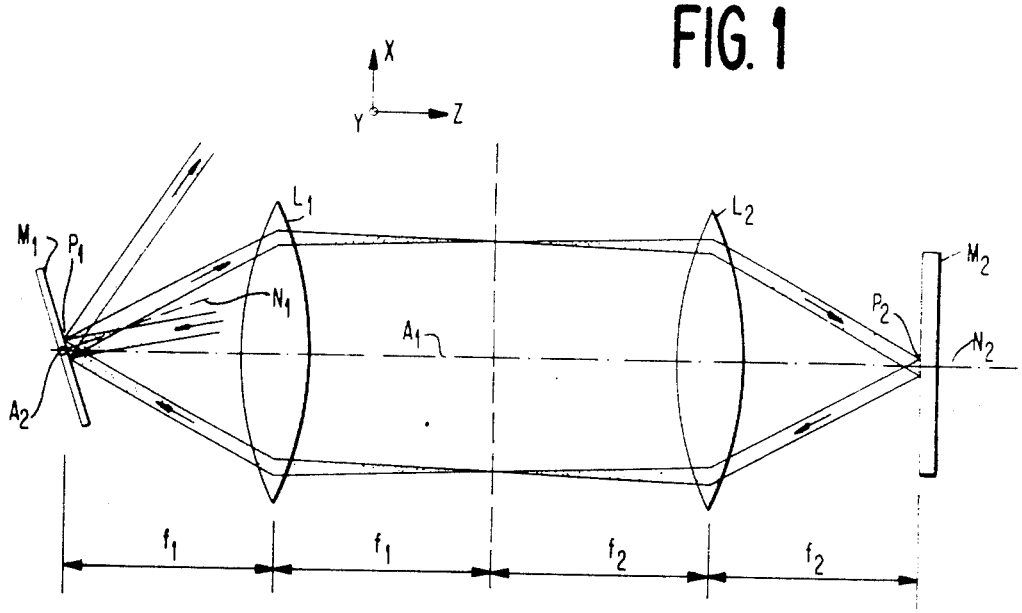
FIG. 1 is a schematic diagram in the XZ plane for demonstrating a principle of a scan angle multiplier according to the invention.

The imaging system for the scan angle multiplier is shown in FIG. 1 of the drawings. The system comprises a mirror $M_1$ spaced from lens $L_1$ by a distance equal to the focal length $f_1$ of the lens. A second lens $L_2$ is spaced on the other side $L_1$ by a distance equal to the sum of the focal lengths, $f_1 + f_2$, of the two lenses. On the other side of lens $L_2$ is a second mirror $M_2$ spaced therefrom by a distance equal to the focal length $f_2$. The mirrors and lenses are positioned on a common optical axis $A_1$ running in the Z direction. In the preferred embodiment, mirror $M_1$ is the deflector mirror and pivots about the focal point of lens $L_1$. The deflection or scanning axis $A_2$ about which mirror $M_1$ pivots projects out of the plane of the paper (i.e., in the Y direction) in the illustration shown in FIG. 1. For purposes of this initial description, the system illustrated in FIG. 1 is assumed to be two-dimensional. As will be shown with respect to FIG. 2, the dimension of the system in the Y axis must be taken into account. The two-dimensional illustration of FIG. 1 is, however, useful to convey the concept of scan angle multiplication. Thus, as shown therein, an inverted image of the deflector mirror $M_1$ is produced at the focal plane lens $L_2$ where mirror $M_2$ is located in the XY plane (i.e., having its normal $N_2$ collinear with axis $A_1$) to reflect, from point $P_2$ thereon, a secondary upright image back on mirror $M_1$. A collimated laser beam striking the deflector mirror at point $P_1$ will travel as shown through the system, returning through points $P_1$ and $P_2$ in every pass or circuit. The deflection angle increases with each reflection from $M_1$ at point $P_1$. If allowed to continue, the deflection angle will increase until the beam leaves the lens system. For small-angle deflectors where this technique would be considered, a significant increase in deflection angle could be obtained before the beam reaches the edge of the lens. All of the beams shown in FIG. 1 are assumed to lie in the plane of the paper.

Figure 2:
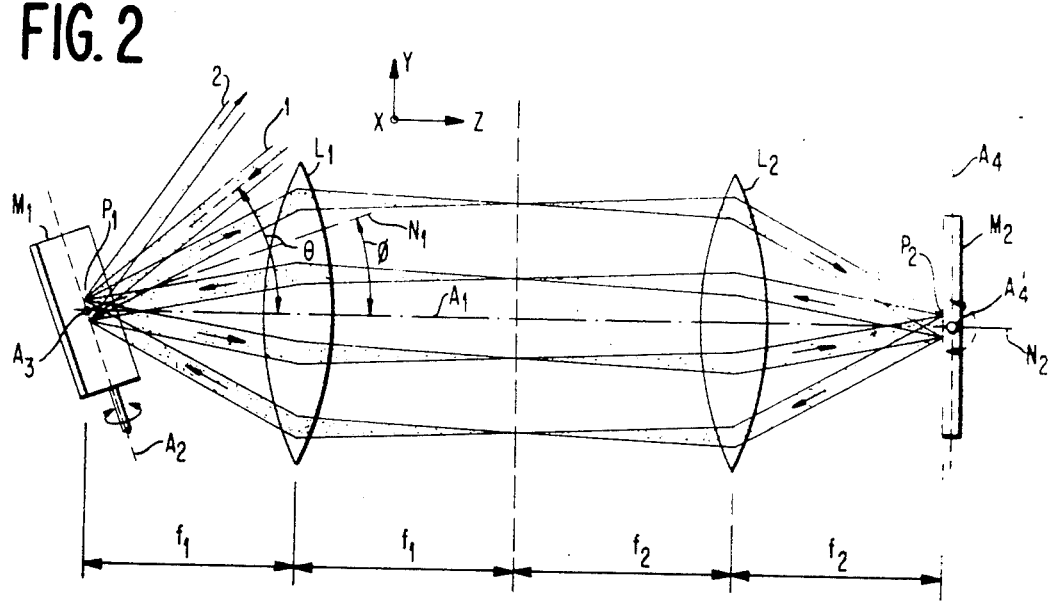
FIG. 2 is a schematic diagram of a multiplier according to the invention projected in the YZ plane.

So far, no mention has been made of the method of introducing the beam into the lens-mirror system or of the way in which the gain is determined. The basic technique is shown in FIG. 2 where the scan angle multiplier is rotated 90° about its axis from the view in FIG. 1 and mirror $M_1$ is tilted about another axis $A_3$. Note that FIG. 1 is in the XZ plane whereas the projection in FIG. 2 is in the YZ plane of the paper and passes through focal point $P_1$. By adjusting mirror $M_1$ so that the projection of its normal $N_1$ on the YZ plane is at an angle $\phi$ from the axis $A_1$ of the lens, a collimated beam entering at (1) will circulate until it exits at (2). Through proper choice of $\phi$, the number of passes can be controlled to give the desired number of reflections from the deflecting mirror $M_1$. Angle $\phi$ is set by rotating mirror $M_1$ about the gain axis $A_3$ which projects out of the plane of the paper, and which also passes through point $P_1$. Axis $A_3$ preferably, but not necessarily, lies in the XZ plane. It is also preferable that axis $A_2$ remain in the YZ plane as $M_1$ is rotated about axis $A_3$; since axis $A_2$ is not perpendicular to axis $A_1$, this requires that axis $A_3$ run in the X direction, perpendicular to the paper.

The theory of operation of this system will now be explained with reference to FIG. 3 which shows an enlarged view of a cross section of the deflector mirror $M_1$ and the first lens $L_1$. As in FIG. 2, the deflection of mirror $M_1$ is about an axis $A_2$ in the plane in the paper. Lens $L_2$ and mirror $M_2$ are not shown since in the case to be described their only function is to return the beam along a path that is symmetric about the lens axis with the path of the outgoing beam from lens $L_1$. For purposes of this explanation, it is assumed that the beam can be considered as a single ray and that the lenses are ideal over their entire surfaces.

Figure 3:
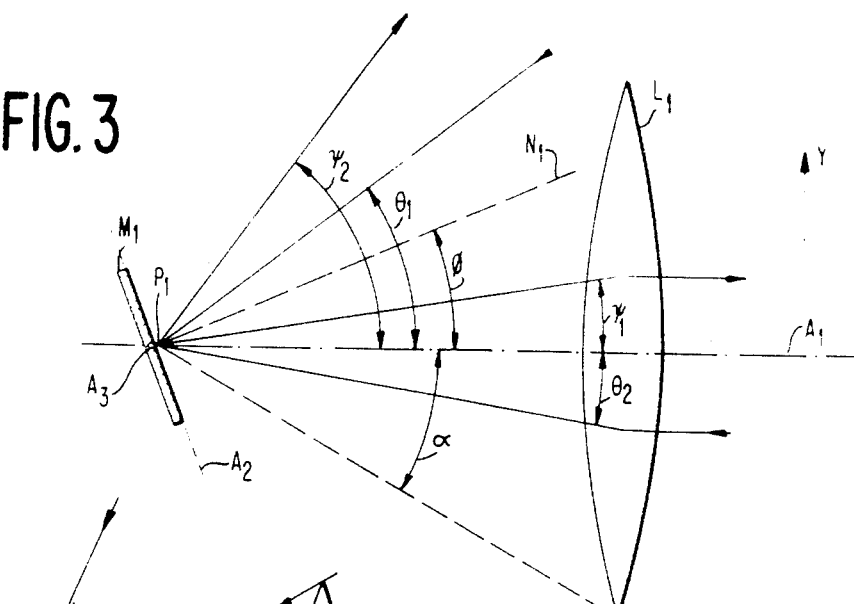
FIG. 3 is an enlarged view in cross section of the left half of FIG. 2 useful in describing the theory of operation of the invention.

In FIG. 3, the angular positions with respect to the axis of the lens system of the incident and reflected rays for the nth reflection from mirror $M_1$ are denoted by $\theta_n$ and $\psi_n$ respectively. The half angular aperture of the lens is denoted by $\alpha$, and $\phi$ is again the angular position of the normal to mirror $M_1$. The angles $\phi$, $\psi$, and $\phi$ are related in the following manner:

$$\psi_n = 2\phi - \theta_n$$

In addition, $$\theta_n = -\psi_{n-1}$$

This latter relation is due to lens $L_2$ and mirror $M_2$. Thus, $$\psi_1 = 2\phi - \theta_1$$
$$\psi_2 = 2\phi - \theta_2 = 4\phi - \theta_1$$

$$\psi_n = 2n\phi - \theta_1$$

$$\psi_G = 2G\phi - \theta_1$$

(1)

$$-\alpha < \psi_1, \psi_2, \ldots, \psi_{G-1} < \alpha \quad |\psi_G| > |\alpha|$$

The integer G is the total number of reflections of the beam from mirror $M_1$. As a result, the scan angle of the deflector is multiplied by the factor G which is defined as the gain of the system.

An interesting result can be obtained by rearranging equation (1), where $\theta_G$ now corresponds to the input angle for a gain of G.

$$\psi_G + \theta_G/2 = G\phi$$

(2)

This indicates that $G\phi$ is the average value of $\psi_G$ and $\theta_G$. Thus, a line at an angle of $G\phi$ can be thought of as an effective normal to mirror $M_1$, since the input and output angles are symmetric about that line.

Figure 4:
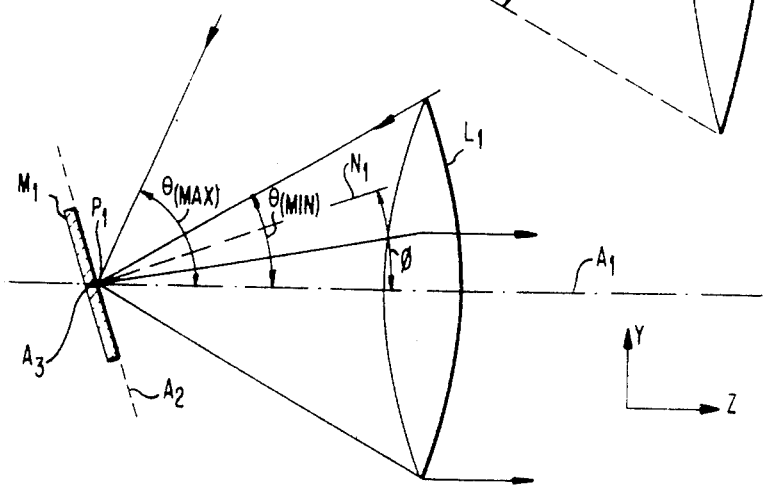
FIG. 4, like FIG. 3, is an enlarged view of the left half of FIG. 2 but illustrates the limitation on the range of the input and output angles due to the angular aperture of the first lens.

A further consideration of the scan angle multiplier is the limitation on the range of the input and output angles due to the angular aperture of lens $L_1$. This is shown in FIG. 4 where for $\theta$ (min.) the input beam just misses the edge of the lens. At the other extreme, $\theta$ (max.), the first reflected beam from mirror $M_1$ just enters the lower boundary of the lens. Since the exit angle is constrained to these same limits, $$\alpha < \theta < \alpha + 2\phi$$
$$\alpha < \psi < \alpha + 2\phi$$

(3)

There are two consequences of equations (3). First, the maximum angular separation between $\theta_G$ and $\psi_G$ is limited to $2\phi$. Substituting the maximum value of $\theta_G$ and the minimum value of $\psi_G$ into equation (2) gives the constraints on $\phi$ for which this condition holds:

$$\alpha + (\alpha + 2\phi)/2 = G\phi$$
$$\alpha = (G - 1)\phi$$

(4)

Thus, when $\alpha$ is an integer multiple of $\phi$, there is a single effective normal located at the center of the input-output range.

The second result of equation (3) occurs when the half angular aperture is not an integer multiple of $\phi$.

$$\alpha \neq (G - 1)\phi$$

(5)

This condition results when $\phi$ is decreased such that $\alpha$ lies within the range $$(G - 1)\phi < \alpha < G\phi$$

(6)

At the upper limit, $\alpha = G\phi$, the situation of equation (4) is repeated, but with a unit increase in gain. Similarly, $\phi$ can be increased until $\alpha = (G - 2)\phi$ resulting in equation (4) with a unit decrease in gain. In either case, for a given value of $\phi$, a maximum of two effective normals will exist in the input-output range described by equation (3). For equation (6), one effective normal will occur at $G\phi$ and a second at $(G + 1)\phi$ corresponding to regions resulting in gains of G and G + 1 respectively. The portion of the input-output range allotted to each can be obtained from equations (2) and (3).

It can be seen from these results that a maximum of two values of gain are possible for a given value of $\phi$. However, since maximum separation of the input and output beams is often desirable, the condition of equation (4) would normally be chosen. In addition, if the half-angular aperture of the lens is held constant, then $\phi$ must decrease as the gain is increased. This results in a corresponding decrease in the input-output range for large multiplication factors.

Figure 5:
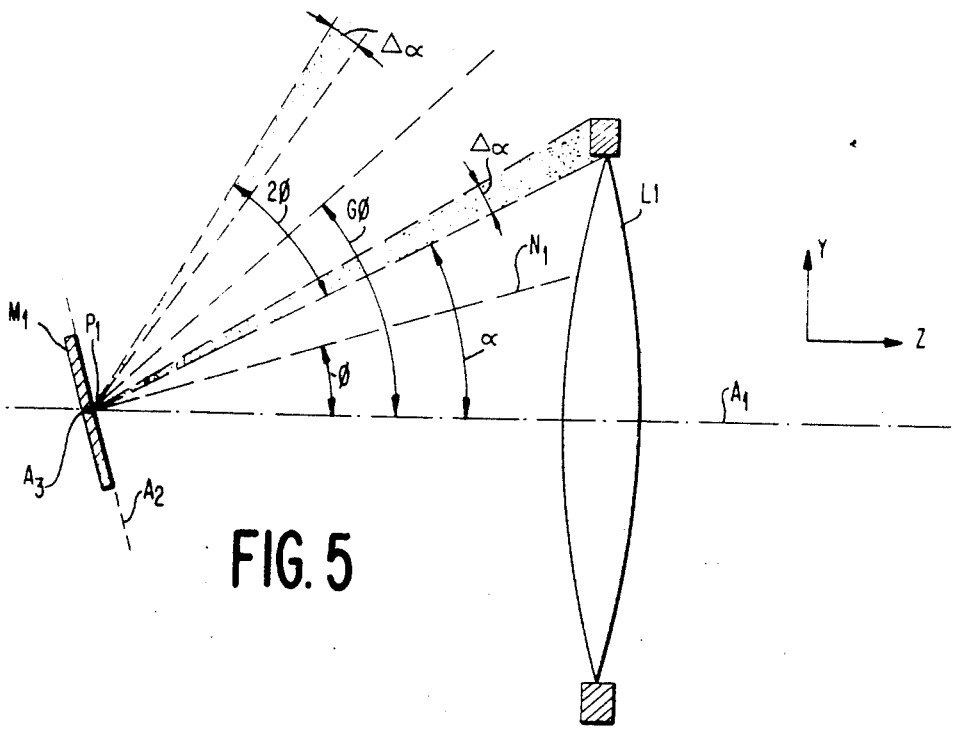
FIG. 5 is a schematic diagram that illustrates the input end of a real case model of a scan angle multiplier and further shows the limitations to the system imposed by the lens mounts and other factors.

When these considerations are applied to the design of an actual device, some of the limitations will be apparent. FIG. 5 shows the input end of a real case model. The angle denoted by $\Delta \alpha$ is that portion of the input angle which is unusable due to several factors. These include the lens mounts and the portion of the lens and input angle required to pass the finite beam diameter. Since the input and output angles are symmetric about an effective normal, an additional $\Delta \alpha$ must be subtracted from the input-output angle.

Thus, the usable input-output range for a real device is given by $2(\phi - \Delta \alpha)$. The upper value of the gain G is limited by the requirements that $\phi > \Delta \alpha$.

The optimum design for a scan angle multiplier is then one for which $\alpha$ is maximized and $\Delta \alpha$ is minimized. This occurs for small $f$-number lenses with the lens diameter large compared to the beam diameter. The beam diameter is determined by the aperture of the deflector. In addition, since a large number of passes through the lens system is required, the lenses should be well corrected over the full aperture required to pass the beam.

There are several possible variations of the scan angle multiplier just described. In one alternate embodiment, the mirror $M_2$ in FIG. 2 is the deflector mirror pivoting on an axis $A_4$ about the focal point of lens $L_2$, and mirror $M_1$ is stationary. Mirror $M_1$ is in this case the input-output mirror with $\phi$ determining the value of G, as before. However, for this case, the multiplication factor will be reduced by one since there is one less reflection from mirror $M_2$ than from mirror $M_1$.

In another embodiment, both of the mirrors $M_1$ and $M_2$ would be deflectors pivoting about the focal points of their associated lenses. If operated in the proper phase with both rotational axes $A_2$ and $A_4$ in the YZ plane, the result is a total deflection of $(2G - 1)$, where G is the gain obtained using mirror $M_1$ alone. Alternatively, when the axes $A_2$ and $A_4$ about which mirrors $M_1$ and $M_2$ are pivoting are perpendicular, the output beam can be made to scan a raster determined by the relative frequencies of the two mirrors.

It will be recalled with respect to the description of the preferred embodiment where mirror $M_1$ is the deflecting mirror and $M_2$ is fixed, the primary function of lens $L_2$ and mirror $M_2$ is to image the deflector mirror $M_1$ back upon itself. This being the case, it is possible in certain limited applications to substitute for lens $L_2$ and mirror $M_2$ a total internal reflecting prism (or "roof prism") which will accomplish the same results. The prism would be located such that its longest face or hypotenuse is perpendicular to the axis of lens $L_1$ and the light is internally reflected from the shorter faces. The prism would be located with its apex a distance from lens $L_1$ equal to the focal length on the air-glass path from the lens through the prism. This variation will provide a gain G of only two.

It will be appreciated from the foregoing description that the present invention has several major advantages. First, in common with a number of other devices, it provides a scanning angle which is larger than that obtainable with present-day deflectors such as torsionally deflected mirrors, optical galvanometers and piezoelectrically driven mirrors. But the present device achieves this result in a particularly simple, compact and inexpensive manner. Secondly, since the output ray always exits from the same point at which the input ray enters, the deflecting mirror may be made with a very small size and low mass. This feature also eliminates all spatial offsets proportional to the magnitude of the deflection angle; that is, its transfer function is extremely linear. In the third place, the multiplication factor of the system shown in FIGS. 1 and 2 is easily adjustable to provide any one of a number of integral multiplication factors merely by rotating mirror $M_1$ about an axis $A_3$ in order to vary the angle between the normal $N_1$ and the optical axis $A_1$. If, for example, the basic scan height on a document is 50 mils, then a hand wheel may be turned to set the scanner to read elite typewritten characters (100 mils), pica typewritten characters (150 mils) or hand printed characters (250 mils). All of this may be accomplished without making any other adjustments; and since nonintegral multiplication factors are impossible, the adjustment is not critical or difficult to make.

It will therefore be apparent that the embodiments shown are only exemplary and that various modifications can be made in construction and arrangement within the scope of the invention as defined in the appended claims.

I claim:

1. A scan-angle multiplier having a constant aperture, comprising:
    a. a light deflector for receiving an incident portion of a light ray at a predetermined location;
    b. means for returning said light ray to said predetermined location for a controllable constant number of passes; and
    c. means for transmitting said ray between said deflector and said returning means, said transmitting means and said returning means being disposed with respect to said deflector so as to control said constant number of passes and such that substantially all of said ray exits from said multiplier upon completion of said constant number of passes.

2. A scan-angle multiplier as recited in claim 1, wherein said deflector is pivotable about a first axis for scanning said ray.

3. A scan-angle multiplier as recited in claim 1, wherein said returning means is adapted to return said ray substantially symmetrically about a further predetermined location.

4. A scan-angle multiplier as recited in claim 1, wherein said deflector is movable about a second axis non-collinear with said first axis for determining said constant number of passes.

5. A scan-angle multiplier as recited in claim 3, wherein said transmitting means includes a first lens spaced from said deflector by a distance equal to its focal length and a second lens spaced from said returning means a distance equal to its focal length, said first and second lenses being spaced from each other a distance equal to the sum of their focal lengths.

6. A scan-angle multiplier as recited in claim 5, wherein said first axis passes through the focal point of said first lens.

7. A scan-angle multiplier as recited in claim 4, wherein said transmitting means comprises a first and second lens having a common axis and wherein said returning means comprises a mirror perpendicular to said common axis and spaced from said second lens a distance equal to the focal length of said second lens.

8. A scan-angle multiplier as recited in claim 7, wherein said second lens is spaced from said first lens a distance equal to the sum of the focal lengths of said lenses.

9. A method of multiplying the scan angle of a light deflector while maintaining a constant aperture, comprising the steps of:
 a. receiving a light ray at a first predetermined location;
 b. scanning said light deflector about a scanning axis so as to sweep said ray recurringly through an angle;
 c. setting a scan-angle gain to one value of a plurality of discrete values;
 d. returning substantially all of said ray to said first location a fixed number of times, said fixed number being determined by said one gain value; and
 e. thereafter, transmitting substantially all of said ray out of said multiplier.

10. The method of claim 9, wherein the step of setting said scan-angle gain comprises tilting said deflector about a gain axis, said gain axis being noncollinear with said scanning axis.

11. The method of claim 10, wherein said plurality of discrete values comprises the set of integers greater than one and less than a predetermined maximum integer.

12. The method of claim 9, wherein said ray is returned to said first location substantially symmetrically about a second predetermined location.

13. The method of claim 12, wherein the step of returning said ray comprises the steps of:
 i. passing said ray through first and second lenses so as to focus said ray onto said second location;
 ii. reflecting said ray from a mirror disposed at said second location; and
 iii. returning said ray through said lenses so as to focus said ray onto said first location.

14. The method of claim 13, wherein said lenses are disposed on a common axis intersecting both said first and said second locations.

15. The method of claim 13, wherein said first and second locations are spaced from said first and second lenses by distances equal to their respective focal lengths, and wherein said lenses are spaced from each other by a distance equal to the sum of their focal lengths.

16. The method of claim 9, wherein the step of scanning said deflector comprises oscillating a first mirror about said scanning axis.

17. The method of claim 16, wherein the step of receiving said ray comprises reflecting said ray from said mirror through an angle less than 180°.

18. The method of claim 16, wherein the step of receiving said ray comprises reflecting said ray from a second mirror through an angle less than 180°.

19. The method of claim 18, wherein the step of scanning said deflector further comprises the step of oscillating said second mirror about a further scanning axis, said scanning axes being perpendicular to each other.

* * * * *